United States Patent

Burrows et al.

[15] 3,706,464
[45] Dec. 19, 1972

[54] POWER SYSTEM FOR LOADING AN EMPTY TRAILER ONTO A TRACTOR OR FOR LOADING PRE-LOADED TRAILERS ONTO A FIFTH WHEEL OF THE TRACTOR

[72] Inventors: Clifford G. Burrows, North Vancouver, British Columbia; John E. Magnuson, Surrey, British Columbia; Ludi Giese, North Vancouver, British Columbia, all of Canada

[73] Assignee: Canadian Kenworth Ltd., Burnaby, Canada

[22] Filed: Dec. 13, 1970

[21] Appl. No.: 100,957

[52] U.S. Cl. ..............................280/401, 280/425 R
[51] Int. Cl. ..............................................B62d 53/00
[58] Field of Search.......280/401, 425 R; 298/22 AE; 214/65, 85

[56] References Cited

UNITED STATES PATENTS 2,296,858   9/1942   Larison ..............................280/401

FOREIGN PATENTS OR APPLICATIONS 211,871   6/1956   Australia ..........................280/425 R

*Primary Examiner*—Leo Friaglia
*Attorney*—Seed, Berry & Dowrey

[57] ABSTRACT

A tractor-semi-trailer combination is disclosed, the tractor having power means on the tractor for loading the trailer onto the rear frame of the tractor when the trailer is to be transferred without a load or to load pre-loaded trailers onto a fifth wheel of the tractor. A lift arm is pivotally attached at one end to the tractor sub-frame. An elevatable bell crank is pivotally attached between its ends to the opposite end of the lift arm. To the respective ends of the bell crank are pivotally attached the fifth wheel and power means, suitably a double-acting power cylinder interconnected between the tractor frame and bell crank. The bell crank carries a hook member which engages a pin carried by the lift arm when rotated about its connection to the lift arm, thereby locking the bell crank in a releasable position relative to the lift arm and raising the fifth wheel. A locking member is employed to hold the hook member in engagement with the pin carried by the lift arm. The power means, when actuated, raises the lift arm, bell crank and fifth wheel forward and upward over the rear frame of the tractor, thereby drawing the coupled empty trailer onto the tractor with the trailer wheels supported on the rear frame portion of the tractor.

Loaded semi-trailers with their forward bunk supported on retractable legs are loaded onto the fifth wheel of the tractor by positioning the fifth wheel of the tractor under the trailer reach, raising the fifth wheel by actuation of the power means to engage the trailer kingpin, raising the fifth wheel and bunk sufficiently for the legs of the trailer to clear the ground, retracting the legs, and lowering the fifth wheel to its lowered or "ground" position.

11 Claims, 9 Drawing Figures

PATENTED DEC 19 1972 3,706,464

CLIFFORD G. BURROWS
JOHN E. MAGNUSON
LUDI GIESE
INVENTORS

BY *Seed, Berry & Downey*

ATTORNEYS

CLIFFORD G. BURROWS
JOHN E. MAGNUSON
LUDI GIESE
INVENTORS

CLIFFORD G. BURROWS
JOHN E. MAGNUSON
LUDI GIESE
INVENTORS

BY *Seed, Berry & Dowrey*

ATTORNEYS

3,706,464

POWER SYSTEM FOR LOADING AN EMPTY TRAILER ONTO A TRACTOR OR FOR LOADING PRE-LOADED TRAILERS ONTO A FIFTH WHEEL OF THE TRACTOR

BACKGROUND OF THE INVENTION

1. Field of the Invention

This invention relates to a power load-unload system and mechanism of a tractor-trailer combination for loading and unloading semi-trailers onto a tractor, to a method of doing such, and to a method of loading empty or loaded semi-trailers onto the fifth wheel of a tractor.

2. Prior Art Relating to the Disclosure

Semi-trailer vehicles of the type shown in the drawings are utilized in hauling logs from a logging operation or marshalling yard to a log dump, lumber or pulp mill. Because the semi-trailer vehicles are sometimes difficult to handle on winding and mountain roads, particularly when the trailer is empty, the trailers, when empty, are normally carried on the tractor. Most of the self-loading and unloading systems for tractor-trailer combinations have utilized a cable and winch system to pull the trailer forward and upward on to the rear frame portion of the tractor. These have not been entirely satisfactory because cable type devices do not afford adequate control over movement of the trailer. In addition they require the operator to leave the cab of the tractor in order to attach the cable to the trailer or to unlatch the cable from the trailer. To attach or unattach the cable the operator or someone under his direction generally has to climb up onto the tractor and runs the risk of injury. Powered winches and other mechanisms are required to accomplish the loading and unloading. Cable type devices for pulling a trailer onto a tractor are disclosed in U.S. Pat. Nos. 2,009,654, 2,112,201, 2,233,697 and 2,296,858. U.S. Pat. No. 2,282,137 discloses a loading device using sprocket chains for moving the trailer into a position such that a jack can engage the front axle of the trailer and draw the trailer forward and upward into carrying position over the rear end of the tractor. U.S. Pat. No. 2,518,410 discloses a clamping means for connection to the rear end of a tractor unit for supporting the axle of an empty trailer. U.S. Pat. No. 3,239,237 discloses a retractable logging trailer unloading strap pivotally secured to the trailer at the lower ends of its depending legs for movement about an axis extending between the legs.

SUMMARY OF THE INVENTION

This invention relates to a load and unload system mechanism interconnecting a tractor and trailer and to a method for loading and unloading the trailer onto the tractor. The load-unload system is useful in loading and unloading semi-log trailers onto the rear portion of its tractor in "piggy back" fashion. A "semi-trailer" is one in which wheels are provided at only one location, namely adjacent the rear of the trailer, with the front end of the trailer supported by the tractor. The load-unload system illustrated is hydraulically powered but an electrical-mechanical power mechanism or other suitable power means may be substituted. This system includes a rotatable linkage interconnecting the trailer and tractor and power means operatively connected to the linkage whereby the trailer is caused to be drawn upward and forward onto the rear of the tractor. In particular, a bell crank is pivotally attached intermediate its ends to a lift arm, the other end of the lift arm being pivotally attached to the frame of the tractor. The bell crank is attached to a fifth wheel which supports the forward end of a semi-trailer and to power means such as the piston of a fluid cylinder. Rotation of the bell crank about its connection to the lift arm in one direction causes the fifth wheel to be raised. At the same time a hook member carried by the bell crank engages a pin carried on the lift arm. A locking member releasably locks the bell crank in a fixed position with respect to the lift arm. The power means is then actuated to raise the lift arm, bell crank and fifth wheel forward and upward over the tractor drawing the trailer onto the rear of the tractor, the wheels of the trailer resting on the tractor frame above the rear wheels thereof. Prior to actuation of the loading mechanism, the length of the trailer is reduced by telescoping the reach.

The objects of this invention are:

1. to provide a power operated load-unload system for loading and unloading empty semi-trailers from ground position to carry position onto the rear of a tractor unit;

2. to provide a power operated system for loading preloaded semi-tractors onto the fifth wheel of a tractor unit;

3. to provide a trailer load-unload system which requires a minimum of activity by the operator and substantially reduces the possibility of injuries; and 4. to provide a method of loading pre-loaded trailers onto the fifth wheel of a tractor.

DESCRIPTION OF THE PREFERRED EMBODIMENTS

The trailer load-unload system as herein illustrated and described includes a power mechanism to load preloaded trailers onto the fifth wheel of a tractor, or to load and unload empty trailers from ground position to carry position supported on the tractor. The load-unload system is advantageously used with semi-trailers for transporting logs. For example, a trailer may be attached to a tractor having the load-unload system incorporated on the rear sub-frame and, if desired, a second full trailer hitched to the lead trailer. After unloading the logs, the second trailer is uncoupled from the lead semi-trailer, the lead trailer loaded onto the tractor and the second trailer coupled to a reach hitch on the rear end of the tractor. The tractor may then return to the woods, unload the empty trailers, and couple onto preloaded trailers for return to the mill site or other location.

Figure 1:
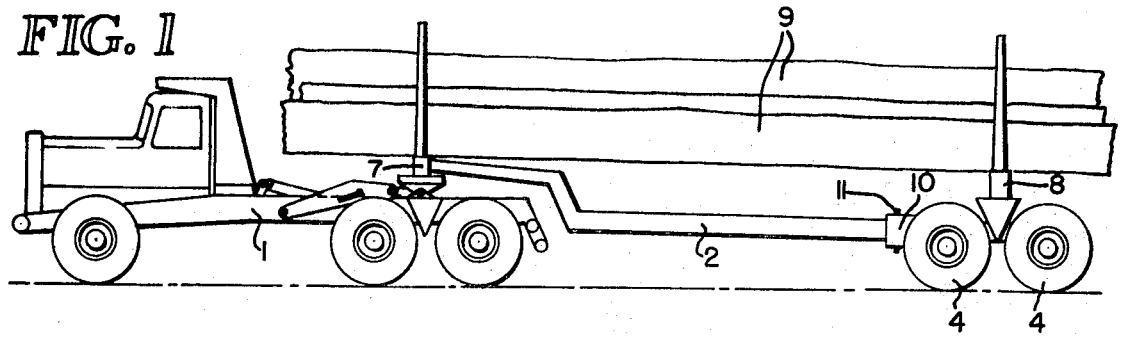
FIG. 1 shows a tractor-trailer combination for transporting logs or similar elongated objects with a loaded trailer secured to the tractor in a conventional manner.
Figure 8:
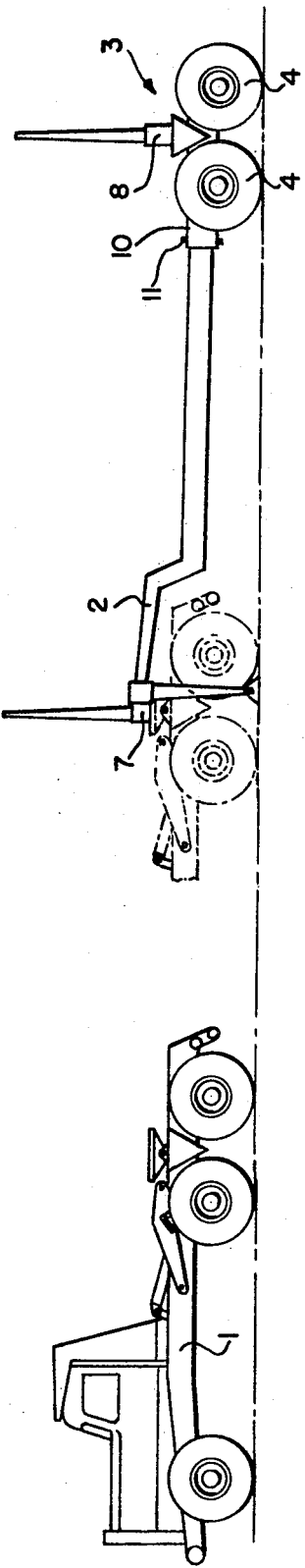
FIGS. 8 and 9 illustrate operation of the load-unload system in loading preloaded trailers onto the fifth wheel of a tractor unit.
Figure 9:
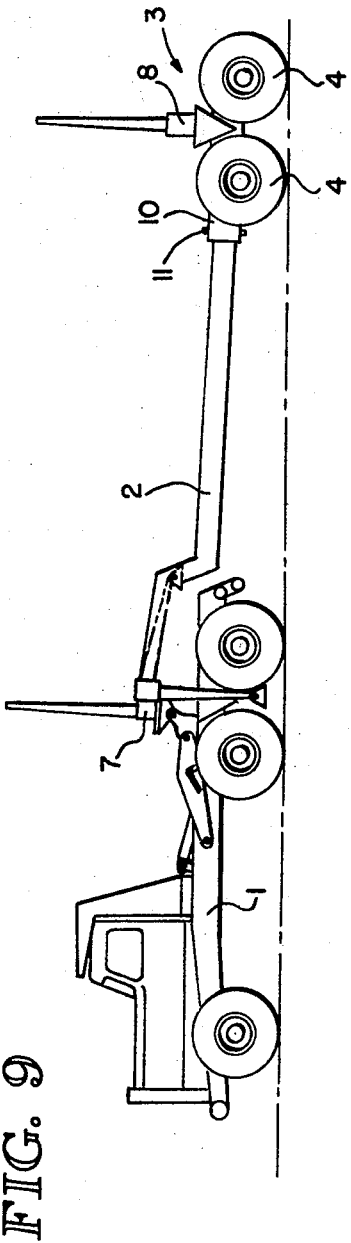

Referring to FIG. 1, a conventional tractor having a sub-frame 1 is shown, the tractor connected through reach 2 to a dual axle trailer 3 having four or eight wheels 4. A ramp 5 for the inner wheels of the trailer is provided at the rear end of the tractor. The ramp 5 includes guide flanges 6 to guide the inner wheels of the generally eight-wheeled trailer up over the rear wheels of the tractor when the trailer is drawn from ground position to carry position. The rear wheels of the trailer crawl up the ramp and over the rear wheels of the tractor. Mounted on the forward end of the trailer and over the axle of the trailer are transversely extending "bunks" or steel beams 7 and 8 on which logs 9 or other load may be rested. Support legs 18 are attached to the forward bunk 7 as shown in FIGS. 8 and 9. The legs have a supporting foot 19 on their lower ends and are adapted to pivot about their connection to the bunk 7. The legs, in lowered position, support the trailer, loaded or unloaded, at a level such that the fifth wheel of the tractor can be backed beneath the trailer and attached thereto as will be more fully described. The reach 2 is slidably supported in reach barrel 10 of the trailer and can be telescoped by withdrawing pin 11 prior to loading of the trailer onto the tractor by backing the tractor. Once the reach is telescoped to its reduced length, the pin 11 is replaced. The forward end of reach 2 is releasably attached to a fifth wheel (see FIGS. 5 and 6) with a king pin (not shown). The fifth wheel includes a fifth wheel plate 12 of considerably greater width than ordinarily employed. The upper surface of the fifth wheel is in direct contact with a wear plate 13 rigidly secured to the lower side of bunk 7. The fifth wheel plate has a slot 14 on the rear side thereof as shown in FIG. 6, the sides of the slot diverging outwardly so that the slot is considerably wider at its outer end. The connecting pin or king-pin carried on the underside of the trailer reach 2 enters the slot on backing of the tractor. The king pin is guided through the narrow inner portion of the slot and is gripped by jaws (not shown) in a conventional manner. On the underside of the fifth wheel plate 12 are integral downwardly extending ears 15 through which pivot pin 16 is passed. The pivot pin 16 rests upon spaced apart upwardly extending supports 17 secured to the tractor sub-frame when the trailer is in ground position. The fifth wheel plate 12 is thus permitted to rock in a vertical arc to compensate for changes in the height between the front and rear ends of the tractor or trailer.

Figure 5:
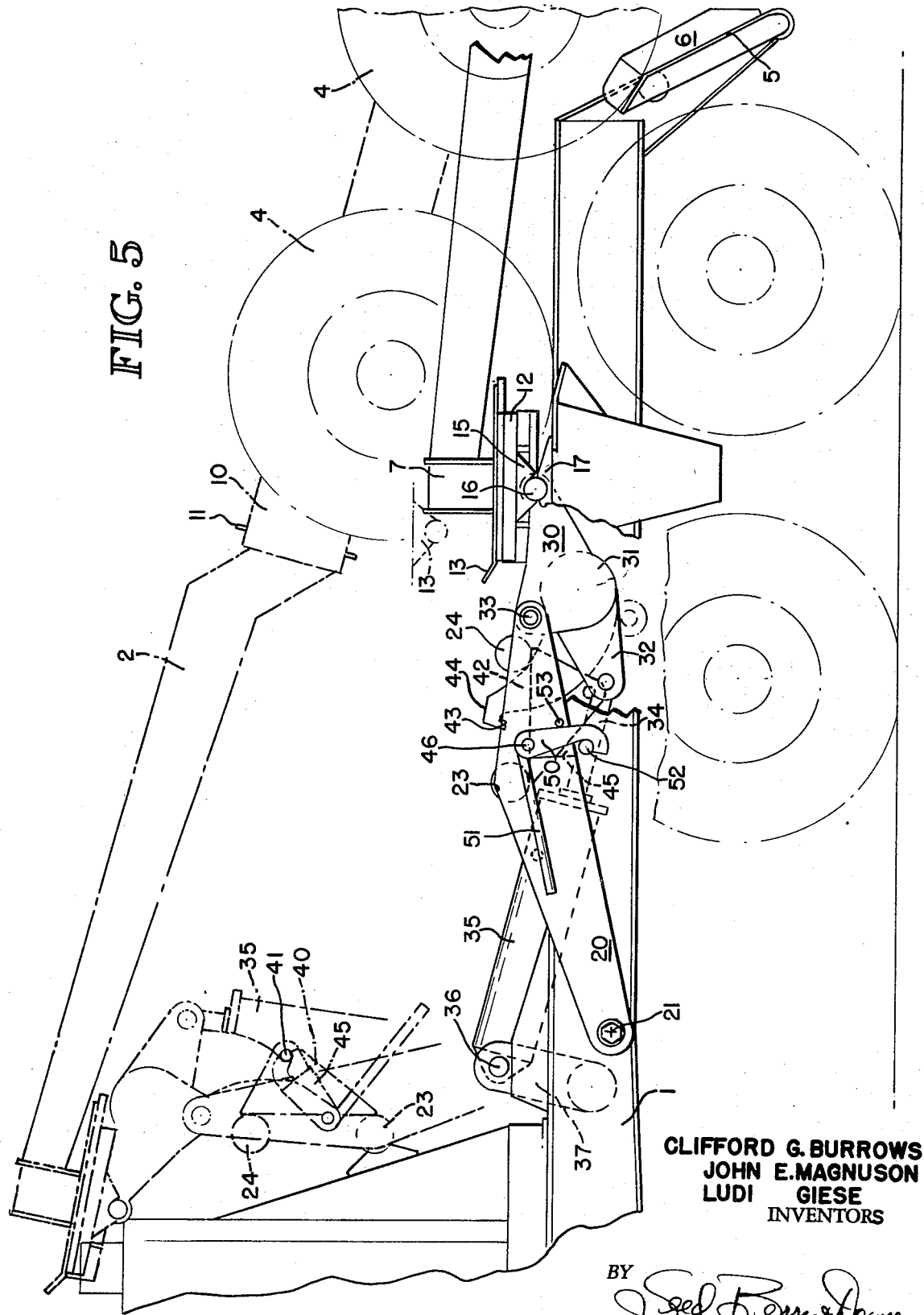
FIG. 5 is a side elevational view of the linkage and power system of this invention shown in ground position by solid lines and in raised or carry position by phantom lines.
Figure 6:
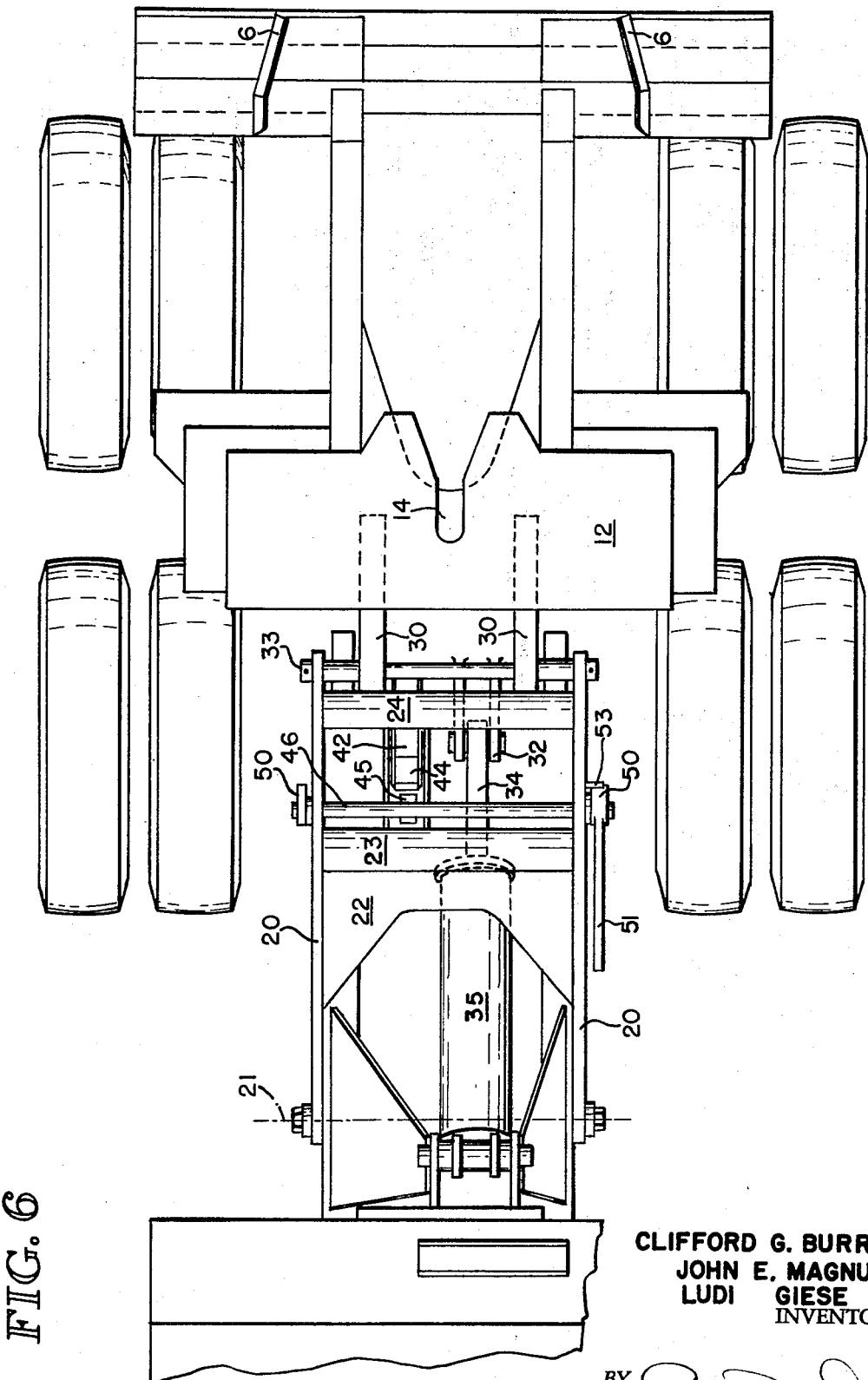
FIG. 6 is a plan view of the linkage and power system of FIG. 5 in ground position.

The power load-unload mechanism is shown generally in FIGS. 5 and 6 and includes lift arms pivotally secured at one end to the sub-frame of the tractor. A bell crank assembly is pivotally attached intermediate its ends to the opposite end of the lift arms. Power means, advantageously one or more double-acting fluid-operated cylinders are pivotally attached to one end of the bell crank with the opposite end of the bell crank pivotally attached to the fifth wheel. The bell crank is rotated counterclockwise by the power means to raise the fifth wheel body substantially vertically. A lock assembly is actuated to lock the bell crank in a fixed position with respect to the lift arms. Power means are then used to raise the fifth wheel together with the trailer forward over the tractor while drawing the trailer wheels up the ramp on the rear of the tractor to carry position over the tractor wheels.

Figure 7:
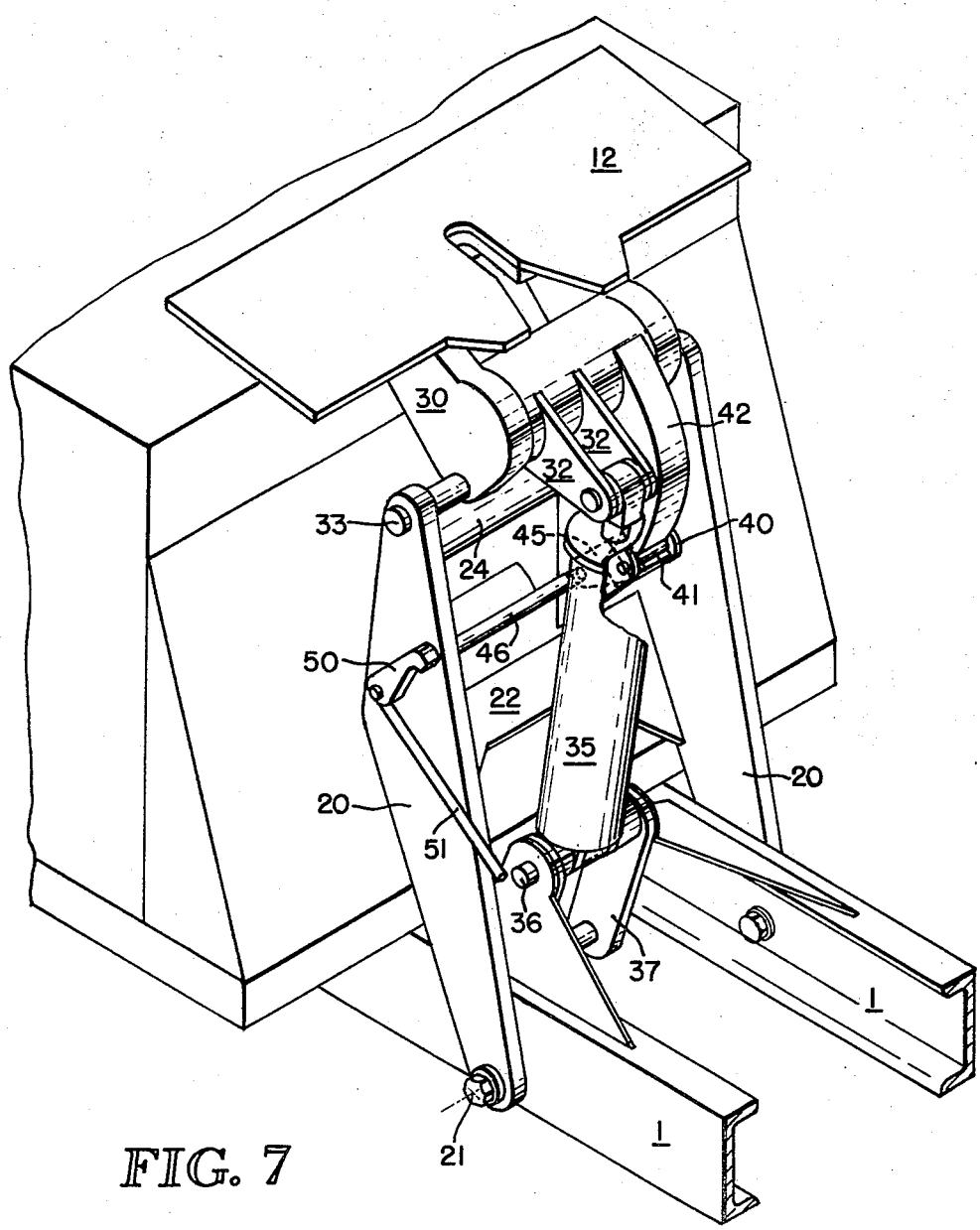
FIG. 7 is a perspective view of the linkage and power system of FIGS. 5 and 6 with parts broken away for clearer viewing.

Referring to FIGS. 5 and 6, two parallel lift arms 20 are pivotally attached at one end to the sub-frame 1 of the tractor about a first horizontal axis 21. The arms are held in spaced relation by spacer plate 22 and round spacers 23 and 24. The bell crank assembly is pivotally attached between the ends of the arms opposite their point of attachment to the frame of the tractor. The bell crank assembly includes two spaced-apart plates 30 held in spaced relation by member 31. Crank 32 is welded or otherwise secured to member 31, the crank consisting of two parallel plates (see FIGS. 6 or 7).

The bell crank assembly is pivotally secured between its ends to shaft 33 extending through the upper ends of arms 20 and plates 30 as shown. The plates 30 are also pivotally secured to the fifth wheel 12 by pivot pin 16. Crank 32 of the bell crank assembly is pivotally attached to suitable power means such as the piston 34 of a double-acting fluid operated cylinder 35. The fluid operated cylinder or cylinders are pivotally attached to the tractor frame by pin 36 extending between parallel supports 37 attached to the tractor sub-frame. The pivot point of the cylinder is above and slightly to the left of the pivot point of arms 20, as seen in FIG. 5. The fluid operated cylinder may be a heavy duty double acting hydraulic cylinder having a lift capacity of 30,000 pounds or more. Fluid to the cylinder is generally supplied from an engine driven hydraulic pump. The fluid operated cylinder, lift arms, and bell crank assembly are so related such that, on extension of piston 34, the bell crank assembly is rotated counterclockwise about its pivotal connection to arms 20, thereby raising the fifth wheel substantially vertically. Rotation of the bell crank assembly is continued until a hook member carried by the bell crank assembly engages a pin supported by the lift arms to lock the bell crank assembly in a fixed position with respect to that of the lift arms.

Two parallel, substantially triangular plates 40 are secured between the rounded spacers 23 and 24 of the lift arms, the spacers being substantially parallel to arms 20. A pin 41 is extended through the lower end of the two triangular plates 40. A hook member 42, having a downwardly facing hook 43, is secured to member 31 of the bell crank assembly. The planar surface 44 of the hook member behind the hook is substantially flat. The hook member is positioned such that, on rotation of the bell crank assembly by extension of piston 34, hook 43 engages pin 41 extending between the parallel triangular plates 40 to lock the bell crank assembly in a fixed position with respect to the lift arms. To retain the hook in place, a pawl 45, attached to rotatable shaft 46, is dropped into position behind planar surface 44 to hook member 42, thereby securing the hook member 42 and bell crank assembly in fixed position relative to that of the lift arms. Shaft 46 extends through and between the parallel arms 20. On each end thereof is a latch 50. One of the latches has a handle 51 secured thereto for effecting rotation of the shaft and latches. When the trailer is in ground position, the latches 50 engage pins 52 attached to the tractor sub-frame and are locked in that position by locking pin 53. In this locked position, the latches prevent movement of the load-unload system relative to the tractor sub-frame. When a trailer is to be loaded onto the tractor the locking pin 53 is removed and the latches 50 disengaged from pins 52. Rotation of shaft 46 moves the latches from locked to unlocked position and also moves pawl 45. When the hook member engages pin 41, shaft 46 is rotated so that the pawl 45 contacts planar surface 44 and locks the hook 43 about pin 41.

OPERATION

Figure 2:
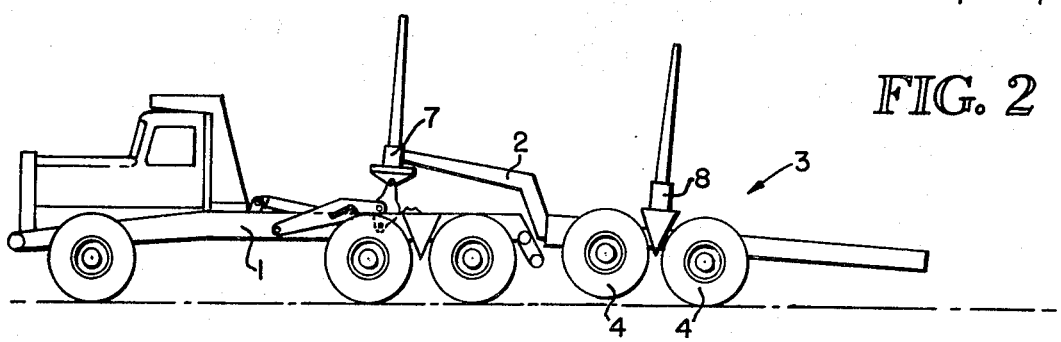
FIGS. 2–4 illustrate the operation of the load-unload system in loading an empty trailer from ground position to carry position.
Figure 3:
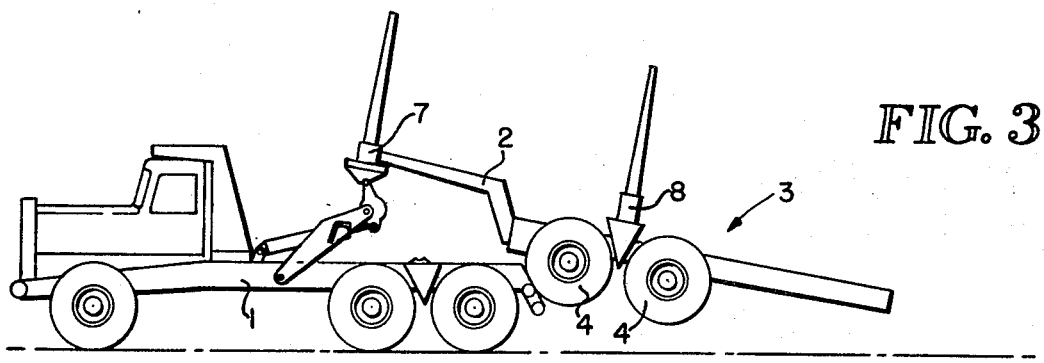
Figure 4:
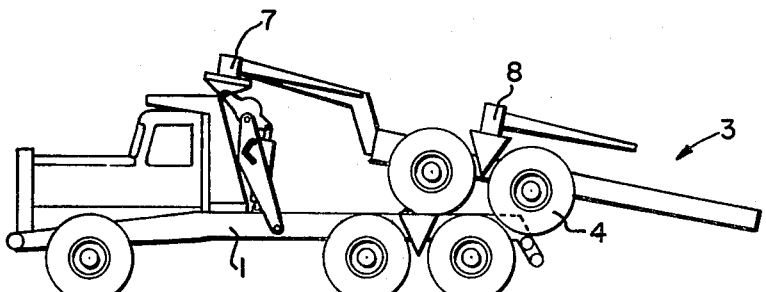

The load-unload system provides a means of loading pre-loaded log trailers onto a fifth wheel and a means of loading and unloading empty trailers from ground position to carry position on the tractor. FIGS. 2-4 illustrate the manner in which an empty log trailer is loaded over the rear wheels of the tractor. FIGS. 8 and 9 illustrate the manner in which pre-loaded trailers are loaded onto the fifth wheel of a tractor.

Referring to FIGS. 2-4, locking pin 11 is removed and the trailer backed to telescope the reach 2 as shown in FIG. 2. Pin 11 is then replaced to lock reach 2 in its shortened position. Hydraulic cylinder 35 is activated to extend piston 34, causing the bell crank assembly to rotate counterclockwise and raise the fifth wheel vertically to the position shown in FIG. 2. Rotation of the bell crank assembly also effects engagement of the hook 43 with pin 41. Latches 50 are then disengaged from pins 52. The locking pins 53 may be replaced to hold latches 50 in unlocked position. Disengagement of latches 50 permits rotation of shaft 46 and pawl 45 carried by shaft 46 into position behind planar surface 44, thereby locking the position of the bell crank with respect to the lift arms. The piston of the cylinder is then retracted to raise the fifth wheel together with the trailer forward over the tractor while bringing the trailer wheels up the ramp on the rear frame of the tractor to carry position over the tractor wheels as shown in FIGS. 3 and 4.

If a second trailer is to be hauled it may be hitched to the rear of the tractor by conventional means.

To load preloaded trailers onto the fifth wheel, the tractor is backed to a fully assembled loaded train of trailers or to a single loaded semi-trailer as shown in FIG. 8. The fifth wheel is raised by extension of the piston of the fluid operated cylinder and rotation of the bell crank to the height necessary to engage properly with the trailer king pin as shown in dotted lines in FIG. 8. The tractor is then backed carefully under the forward bunk 7 and the fifth wheel is adjusted to the height required for proper alignment of the fifth wheel slot with the king pin. The tractor is backed until the jaws of the fifth wheel are fully locked around the trailer king pin. The fifth wheel is then raised sufficiently for the legs 18 of the semi-trailer to clear the ground. Locking pins on the legs are removed and the legs swung upwardly and locked in raised position as shown in dotted lines in FIG. 9. The fifth wheel is then lowered to ground position where it rests on the upended supports 17 attached to the tractor sub-frame and the power take-off on the tractor disengaged. The trailer is then ready to be hauled away.

The load-unload system of this invention provides a reliable system. It is of sturdy construction, easily maintained, and can be operated more safely than the cable-type devices.

The embodiments of the invention in which an exclusive property or privilege is claimed are defined as follows:

1. A system for loading and unloading a trailer, releasably connected to a fifth wheel, onto the rear of a tractor, comprising;
   a tractor having a rearwardly disposed frame,
   a lift arm pivotally secured to the frame of the tractor about a first axis extending through the lower end of the lift arm,
   a bell crank pivotally attached intermediate its ends to the lift arm about a second axis extending through the upper end thereof,
   a fifth wheel pivotally secured to one end of the bell crank, the fifth wheel supported in lowered position on the frame of the tractor, and
   power means operatively connected to the other end of the bell crank to rotate the bell crank about its pivotal connection to the lift arm for initially raising the fifth wheel substantially vertically and then moving the fifth wheel, lift arm and trailer connected to the fifth wheel upward and forward onto the rear of the tractor.

2. The system of claim 1 further including locking means carried by the bell crank and lift arm for locking the bell crank and lift arm in a fixed position relative to each other on rotation of the bell crank a predetermined amount.

3. The system of claim 2 wherein the locking means includes a pin carried by the lift arm, a hook member carried by the bell crank for engagement about the pin on rotation of the bell crank a predetermined amount to thereby lock the bell crank in a fixed position relative to the lift arm, and retaining means to retain the hook member in engagement about the pin.

4. The system of claim 3 wherein the power means is a double acting fluid cylinder pivotally connected to the tractor frame having a movable piston therein connected to the bell crank so that extension of the piston rotates the bell crank to engage the hook member about the pin and raise the fifth wheel, and so that, once the hook member is engagingly locked about the pin, retraction of the piston raises the fifth wheel, lift arm and bell crank forward and upward over the rear frame of the tractor.

5. A system for loading and unloading a trailer releasably connected to a fifth wheel onto a rear of a tractor comprising;
   a lift arm pivotally secured to the frame of the tractor about a first axis extending through the lower end of the arm for movement between a raised, forward position wherein a trailer is raised and moved forwardly onto the rear of the tractor, and a lowered position wherein the trailer is in ground position,
   a pin carried by the lift arm,
   a bell crank pivotally attached between its ends to the lift arm about a second axis extending through the upper end of the lift arm, the bell crank carrying a hook member which, on rotation of the bell crank about the second axis, engages the pin to lock the bell crank in a fixed position with respect to the lift arm, retaining means to retain the bell crank and lift arm in locked position, a fifth wheel releasably carrying the forward end of a trailer pivotally secured to one end of the bell crank, the fifth wheel supported on the frame of the tractor when the trailer is in ground position, fluid motor means including a cylinder and piston, the piston pivotally connected to the end of the bell crank opposite the fifth wheel operative, on extension of the piston, to cause rotation of the bell crank about the second axis to raise the fifth wheel vertically and engage the hook member of the bell crank with the pin carried by the lift arm to lock the bell crank in a fixed position with respect to the lift arm, and operative, on retraction of the piston to raise the lift arm, bell crank, fifth wheel and trailer upward and forward causing the trailer to be drawn onto the rear of the tractor.

6. The system of claim 5 including latch means for locking the lift arm and bell crank in fixed position when the trailer is in ground position.

7. The system of claim 5 wherein the retaining means is a pawl disposed adjacent the hook member of the bell crank and carried by the lift arm, movement of the pawl into position behind the hook member locking the hook member in engagement about the pin carried by the lift arm.

8. The system of claim 5 including control means operatively connected to the fluid motor means for actuating the fluid motor means from within the tractor cabin.

9. A system for unloading and loading a log trailer releasably connected with a pin to a fifth wheel onto the rear of a logging truck, comprising, a tractor including a frame disposed rearwardly of the tractor, a pair of lift arms interconnected at spaced intervals along their length pivotally secured to the frame of the tractor about a first horizontal axis extending through the lower end of the lift arms, the lift arms rotatable between a lowered position wherein the log trailer is in ground position and a raised, forward position wherein the log trailer is disposed over the frame of the truck in carry position, a pin depending from the lift arms, a bell crank pivotally attached between its ends to about a shaft extending through the upper ends of the lift arms, the bell crank including an integral hook member which, on rotation of the bell crank about its pivotal connection to the lift arms, engages the pin depending from the lift arms to lock the bell crank and lift arms in fixed position relative to each other, retaining means to retain hook member in engagement about the pin, a double-acting fluid motor means including a cylinder and piston, the cylinder pivotally connected to the tractor frame and the piston pivotally connected to the bell crank, extension of the piston of the fluid motor means operating to rotate the bell crank about its pivotal connection to the lift arms to raise the fifth wheel vertically and engage the hook member carried by the bell crank about the pin carried by the lift arms, on movement of the retaining means locking the hook member in engagement with the pin, and retraction of the piston operative to raise and move the lift arms, bell crank, and fifth wheel up over the tractor frame.

10. In combination with a tractor, a power mechanism at the rear of the tractor for advancing a trailer releasably hitched to a fifth wheel from lowered position to a carry position on the tractor, the mechanism comprising:

a fifth wheel supported on the tractor in lowered position, a bell crank pivotally secured at one end to the fifth wheel and at the other end to a power means, a lift arm pivotally secured at one end to the frame of the tractor and pivotally secured at the other end to the bell crank intermediate the ends thereof, and means to lock the bell crank and lift arm together, the power means causing rotation of the bell crank about its connection to the lift arm to raise the fifth wheel, lock the bell crank in its fixed position with respect to the lift arm and then raise the locked together lift arm, bell crank and fifth wheel upward and forward over the rear of the tractor.

11. A method of loading and unloading a trailer onto the rear of a tractor, the trailer supported by its forward end on a fifth wheel which is supported in lowered position on the rear frame of the tractor and connected to a power mechanism operable to raise and lower the fifth wheel vertically a predetermined distance and to move the fifth wheel and tractor upward and forward over the rear of the tractor, the power mechanism including a lift arm pivotally secured to the frame of the tractor about a first axis extending through the lower end of the frame for movement between a raised, forward position wherein a trailer is raised and moved forwardly onto the rear of a tractor, and a lowered position wherein the trailer is in ground position, a pin carried by the lift arm, a bell crank pivotally attached between its ends to the lift arm about a second axis extending through the upper end of the lift arm, the bell crank carrying a hook member which, on rotation of the bell crank around about the second axis, engages the pin to lock the bell crank in a fixed position with respect to the lift arm, retaining means to retain the bell crank and lift arm in locked position, a fifth wheel releasably carrying the forward end of the trialer pivotally secured to one end of the bell crank and resting on the frame of the tractor when the trailer is in ground position, and power means connected to the bell crank operative to cause rotation of the bell crank about the second axis to raise the fifth wheel vertically and lock the bell crank in fixed position with respect to the lift frame and then operative to raise the locked together lift arm, bell crank, fifth wheel and trailer upward and forward causing the trailer to be drawn onto the rear of the tractor comprising;

rotating the bell crank about the second axis to raise the fifth wheel vertically and engage the hook member carried by the bell crank about the pin carried by the lift arm, moving the retaining means into position to retain the hook member in engagement about the pin and thereby lock the bell crank in fixed position relative to the lift arm, and raising the locked together lift arm, bell crank, fifth wheel and trailer supported thereon upward and forward causing the trailer to be drawn onto the rear of the tractor.

* * * * *